(12) United States Patent
Mizoguchi

(10) Patent No.: US 8,912,929 B2
(45) Date of Patent: Dec. 16, 2014

(54) CORRECTION VALUE DERIVATION APPARATUS, DISPLACEMENT AMOUNT DERIVATION APPARATUS, CONTROL APPARATUS, AND CORRECTION VALUE DERIVATION METHOD

(71) Applicant: Canon Kabushiki Kaisha, Tokyo (JP)

(72) Inventor: Masahiko Mizoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/925,631

(22) Filed: Jun. 24, 2013

(65) Prior Publication Data

US 2014/0028478 A1 Jan. 30, 2014

(30) Foreign Application Priority Data

Jul. 30, 2012 (JP) ................. 2012-168847

(51) Int. Cl.
*H03M 1/22* (2006.01)
*G01D 5/247* (2006.01)
*G01D 5/244* (2006.01)

(52) U.S. Cl.
CPC ............ *G01D 5/24476* (2013.01); *G01D 5/247* (2013.01); *G01D 5/24495* (2013.01); *G01D 5/244* (2013.01)
USPC .............................. 341/11; 399/167; 381/310

(58) Field of Classification Search
CPC ...................................................... G01D 5/244
USPC .................. 341/11; 399/167; 381/310
See application file for complete search history.

(56) References Cited

U.S. PATENT DOCUMENTS

| | | | |
|---|---|---|---|
| 6,332,060 B1 * | 12/2001 | Miyamoto et al. | 396/55 |
| 6,947,569 B2 * | 9/2005 | Yamada et al. | 381/310 |
| 7,250,881 B2 | 7/2007 | Kiriyama et al. | |
| 7,561,830 B2 * | 7/2009 | Watahiki | 399/167 |
| 2009/0309532 A1 | 12/2009 | Ueda | |

FOREIGN PATENT DOCUMENTS

| | | |
|---|---|---|
| JP | 02-138819 | 5/1990 |
| JP | 06-058769 | 3/1994 |
| JP | 2006-112862 | 4/2006 |
| JP | 2009-303358 | 12/2009 |

* cited by examiner

*Primary Examiner* — Jean B Jeanglaude
(74) *Attorney, Agent, or Firm* — Fitzpatrick, Cella, Harper & Scinto

(57) ABSTRACT

Detection precision is improved by reducing a detection error of a change in position of a target. A correction value derivation apparatus is provided for deriving a correction value used in correction of a displacement amount derived based on an encoder signal indicating a change in position of a movable portion as a target. A displacement amount derivation unit is configured to derive a detected displacement amount of the movable portion based on the encoder signal. A displacement velocity derivation unit is configured to derive a detected displacement velocity based on the detected displacement amount derived by the displacement amount derivation unit. An average displacement velocity calculation unit is configured to calculate an average displacement velocity over a predetermined displacement range. A correction value derivation unit is configured to derive the correction value based on the detected displacement velocity and the average displacement velocity.

8 Claims, 15 Drawing Sheets

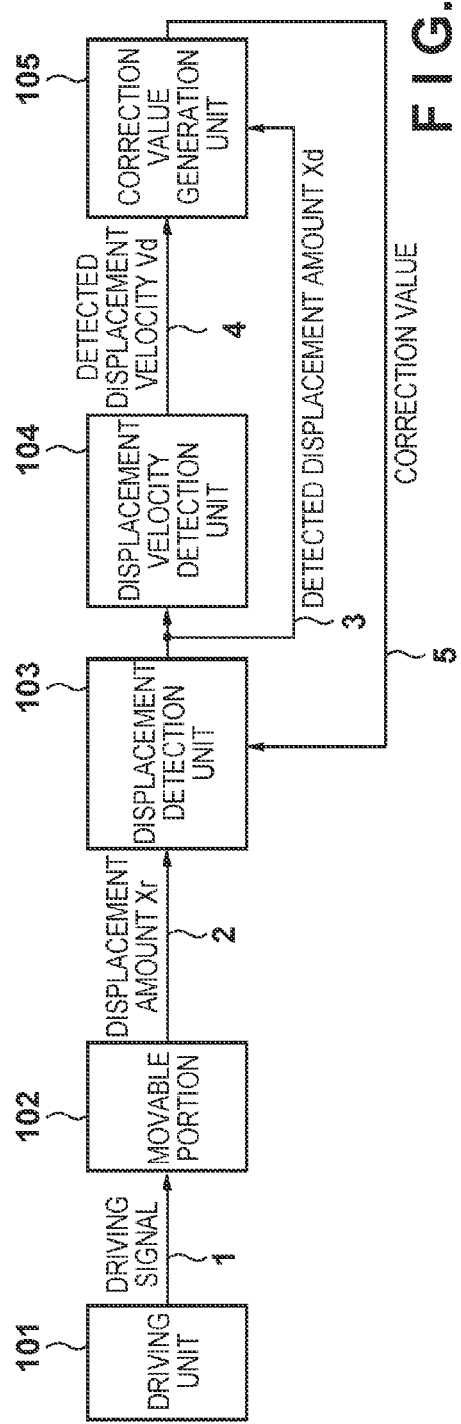
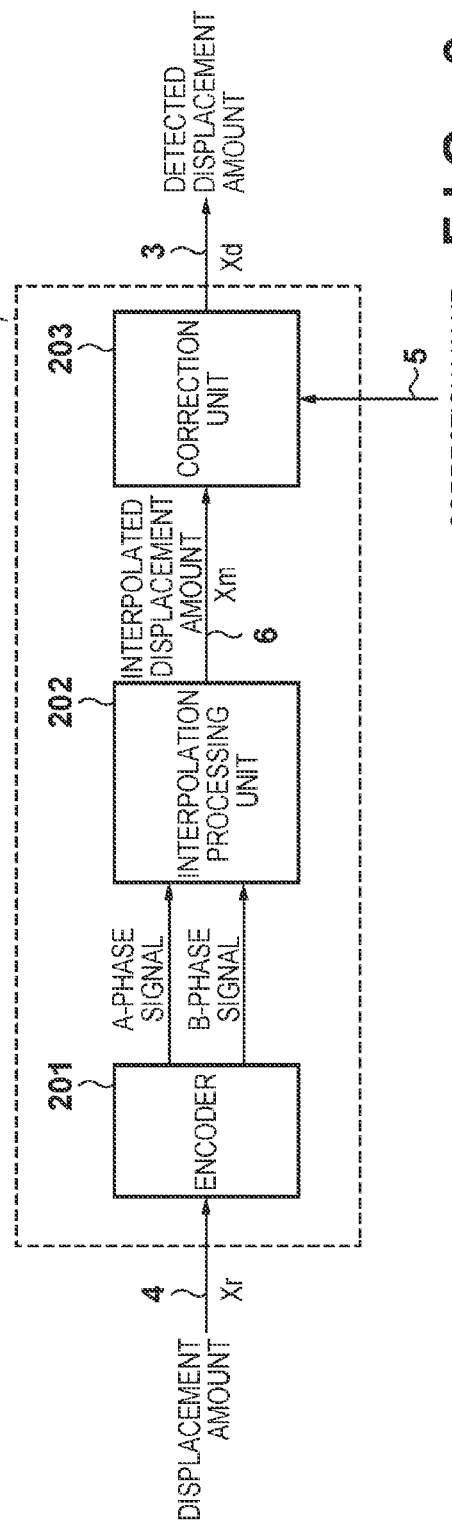

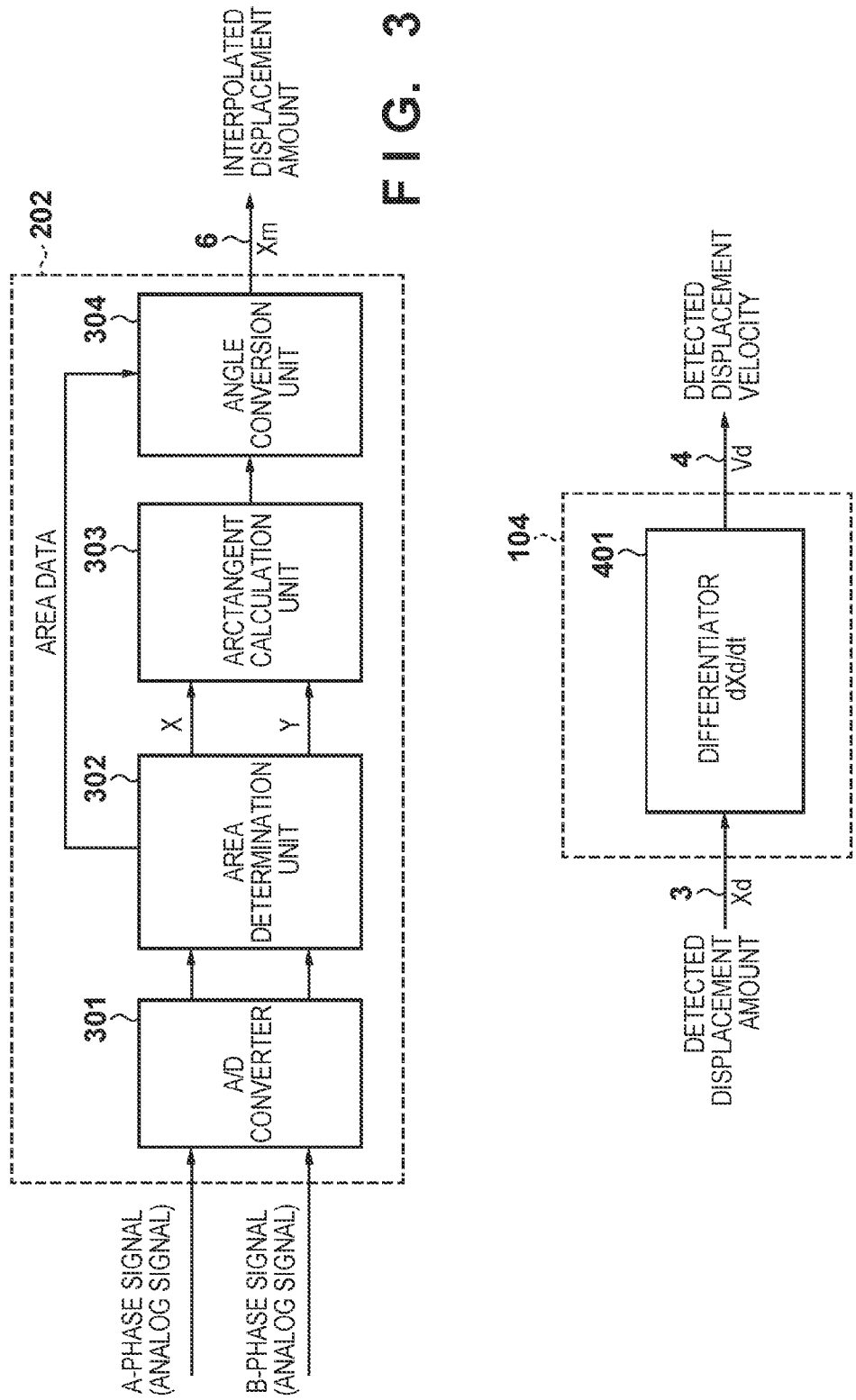

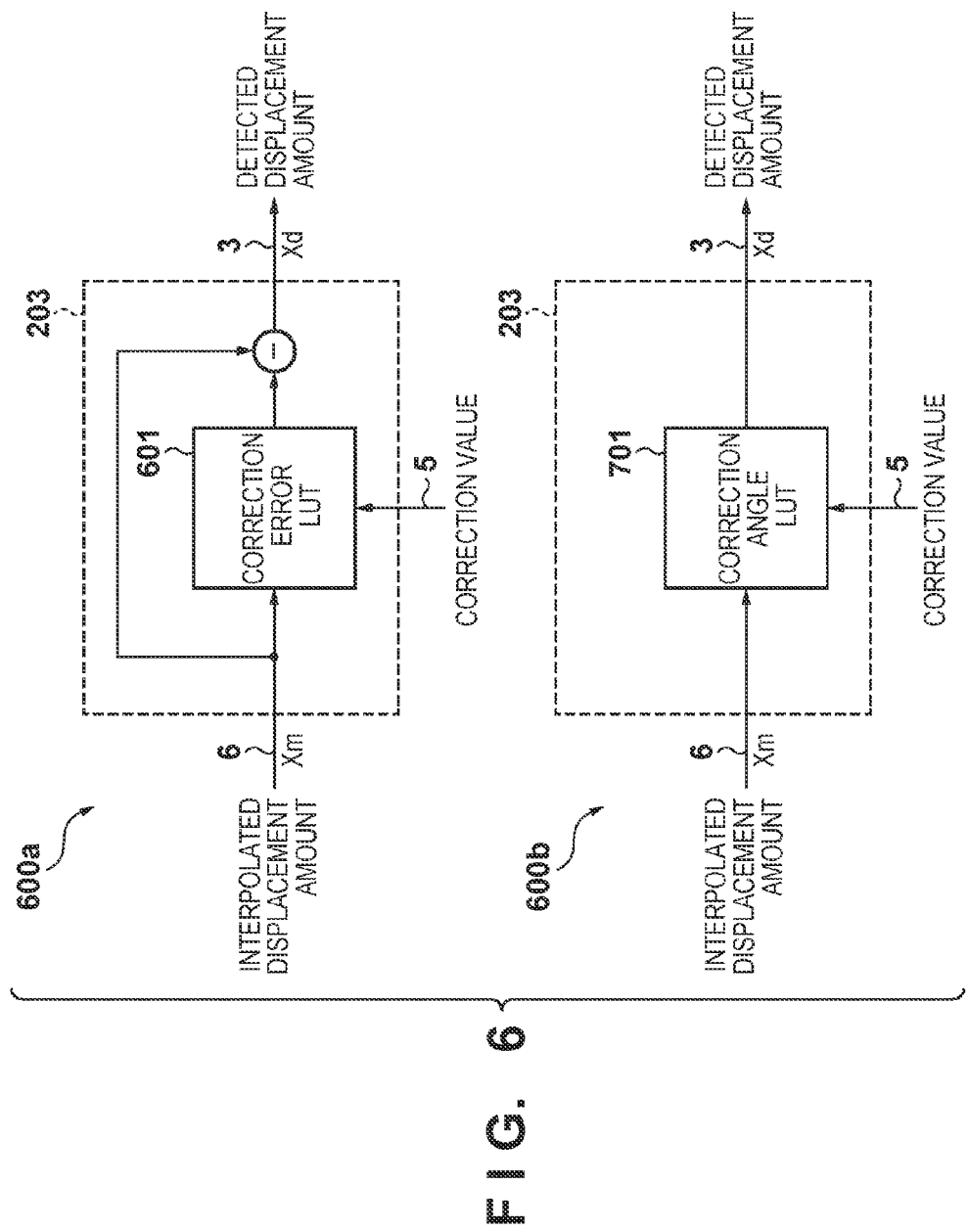
F I G. 6

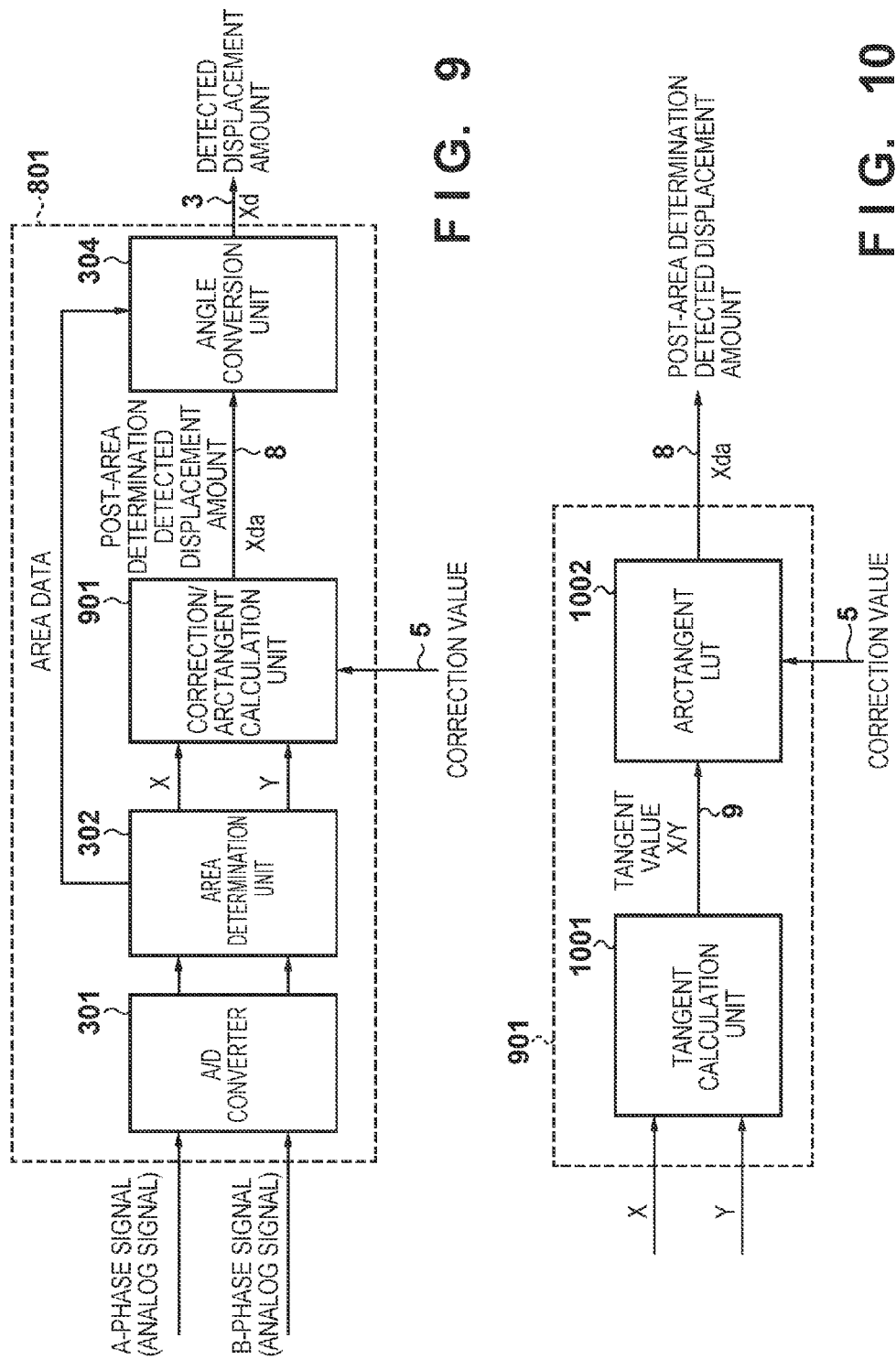

CORRECTION VALUE DERIVATION APPARATUS, DISPLACEMENT AMOUNT DERIVATION APPARATUS, CONTROL APPARATUS, AND CORRECTION VALUE DERIVATION METHOD

BACKGROUND OF THE INVENTION

1. Field of the Invention

The present invention relates to a technique for processing an encoder signal indicating a phase change of a position or angle of a target.

2. Description of the Related Art

In general, an optical rotary encoder is popularly used to detect a moving amount, angle, position, and the like of a rotation member of a motor or the like. A rotary encoder of this type irradiates a rotation signal screen provided with a required signal pattern with uniform light from a light-emitting element including a light-emitting diode (LED) or the like from one side. Then, a light-receiving element such as a photodiode or phototransistor receives and detects transmission light which has transmitted through the signal pattern or reflected light from the signal screen, thus forming an electric signal pattern. An encoder output signal is generated based on the electric signal pattern. As functional segmentations of the encoder, an incremental type and absolute type are known.

In an incremental encoder, a technique for attaining high-precision position detection by interpolation processing (electric division) is known. This technique is premised on that amplitudes of encoder signals and offset values are uniform, and analog sine wave signals of two phases having a 90° phase difference are output. For this reason, the interpolation processing is often executed after the output signals from the encoder are corrected to approach the premises.

As a practical interpolation processing method, a resistance division method disclosed in Japanese Patent Laid-Open No. 02-138819 (patent literature 1) and an arctangent (arctan) calculation method disclosed in Japanese Patent Laid-Open No. 06-58769 (patent literature 2) are known. On the other hand, Japanese Patent Laid-Open No. 2006-112862 (patent literature 3) discloses a method of correcting encoder output signals by detecting errors from an ideal Lissajous waveform included in Lissajous waveforms of two-phase analog signals.

However, actual encoder output signals include harmonic components and nonlinear components, and are not ideal sine wave signals. For this reason, even when errors of amplitudes, offsets, and phases of the encoder output signals are corrected, the corrected signals are not strict sine wave signals, and detection errors are generated upon execution of the interpolation processing. Hence, Japanese Patent Laid-Open No. 2009-303358 (patent literature 4) discloses a method of generating values obtained by differentiating detected displacement amounts (detected angles) of the encoder, that is, correction values that make displacement velocities constant.

However, for example, the method disclosed in patent literature 4 allows to calculate correction values in only a constant velocity driving area. For this reason, in order to calculate suitable correction values, driving control of a target (motor or the like) is required to be executed using a high-precision motor and external driving device having high velocity stability to cause the encoder to detect displacements. For this reason, when a motor having low velocity stability is used, suitable correction values cannot be calculated during normal driving with a velocity change.

SUMMARY OF THE INVENTION

According to an aspect of the present invention, a correction value derivation apparatus for deriving a correction value used in correction of a displacement amount derived based on an encoder signal indicating a change in position of a movable portion as a target, comprises: a displacement amount derivation unit configured to derive a detected displacement amount of the movable portion based on the encoder signal; a displacement velocity derivation unit configured to derive a detected displacement velocity based on the detected displacement amount derived by the displacement amount derivation unit; an average displacement velocity calculation unit configured to calculate an average displacement velocity by calculating an average of detected displacement velocities derived by the displacement velocity derivation unit over a predetermined displacement range; and a correction value derivation unit configured to derive the correction value based on the detected displacement velocity and the average displacement velocity.

The present invention improves detection precision by reducing detection errors of a change in position of a target.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a control block diagram of a motor control apparatus according to the first embodiment;

FIG. 2 is a block diagram showing an example of the arrangement of a displacement detection unit according to the first embodiment;

FIG. 3 is a block diagram showing an example of the arrangement of an interpolation processing unit;

FIG. 4 is a block diagram showing an example of the arrangement of a displacement velocity detection unit;

FIG. 6 is a block diagram showing examples of the arrangement of a correction unit;

FIG. 9 is a block diagram showing an example of the arrangement of an interpolation processing unit with correction;

FIG. 10 is a block diagram showing an example of the arrangement of a correction/arctangent calculation unit;

DESCRIPTION OF THE EMBODIMENTS

A preferred embodiment of the present invention will be described in detail hereinafter with reference to the accompanying drawings. Note that the following embodiment is presented for the exemplary purpose only, and does not limit the scope of the present invention.

First Embodiment

A displacement detection unit 103 mounted in a motor control apparatus will be exemplified below as the first embodiment of a signal processing apparatus according to the present invention.

<Arrangement of Motor Control Apparatus>

Figure 7:
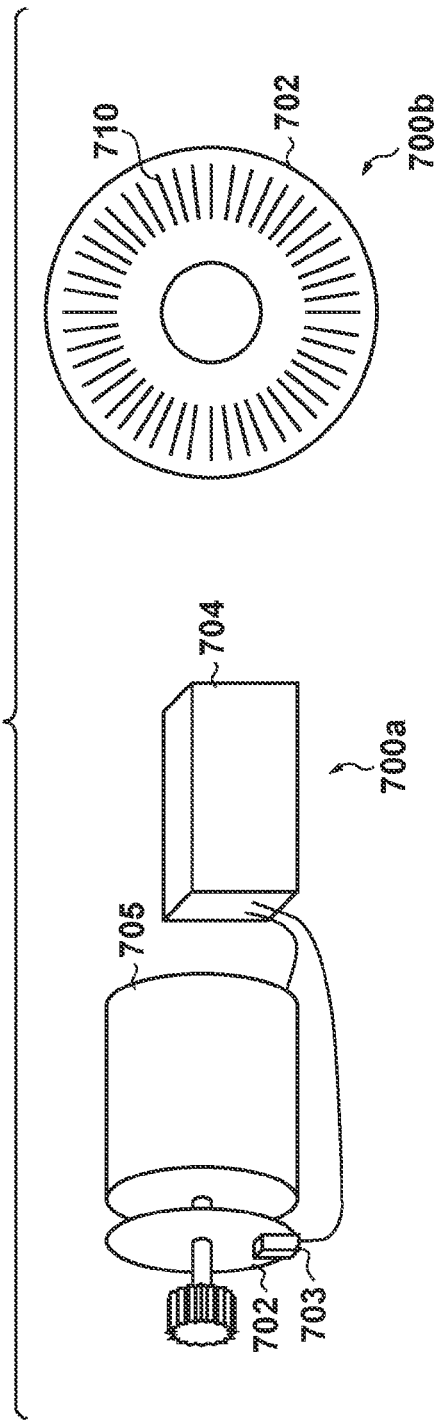
FIG. 7 is a schematic view of the motor control apparatus.

FIG. 7 is a schematic view of a motor control apparatus. Reference numeral 700a denotes an overall view of a motor control apparatus; and 700b, a schematic plan view of an encoder scale 702. The motor control apparatus 700a includes an optical encoder required to detect a rotation angle (displacement amount) of a motor shaft of a rotary motor 705.

The encoder includes an encoder scale 702 having a rotary slit disc and fixed slit disc, and a sensor unit 703 having a light-emitting element (light-emitting diode) and light-receiving element (photodiode). The rotary slit disc is attached to the motor shaft of the rotary motor 705, and is rotated together with the motor shaft. On the other hand, the fixed slit disc and the sensor unit 703 are fixed to, for example, a circuit board. The encoder is configured to locate the rotary slit disc and fixed slit disc between the light-emitting element and light-receiving element.

The encoder scale 702 is formed with a plurality of slits 710. The encoder scale 702 rotates to have the motor shaft as a rotation axis center upon a rotational displacement of the motor shaft of the rotary motor 705. When the rotary slit disc rotates, light coming from the light-emitting element is transmitted or intercepted. Also, the fixed slit disc has two divided fixed slits so as to generate two phases of output signals of the encoder.

The sensor unit 703 includes two light-receiving elements, which respectively detect two different types of light components which have passed through the slits 710 and are separated into A- and B-phase patterns.

Figure 27:
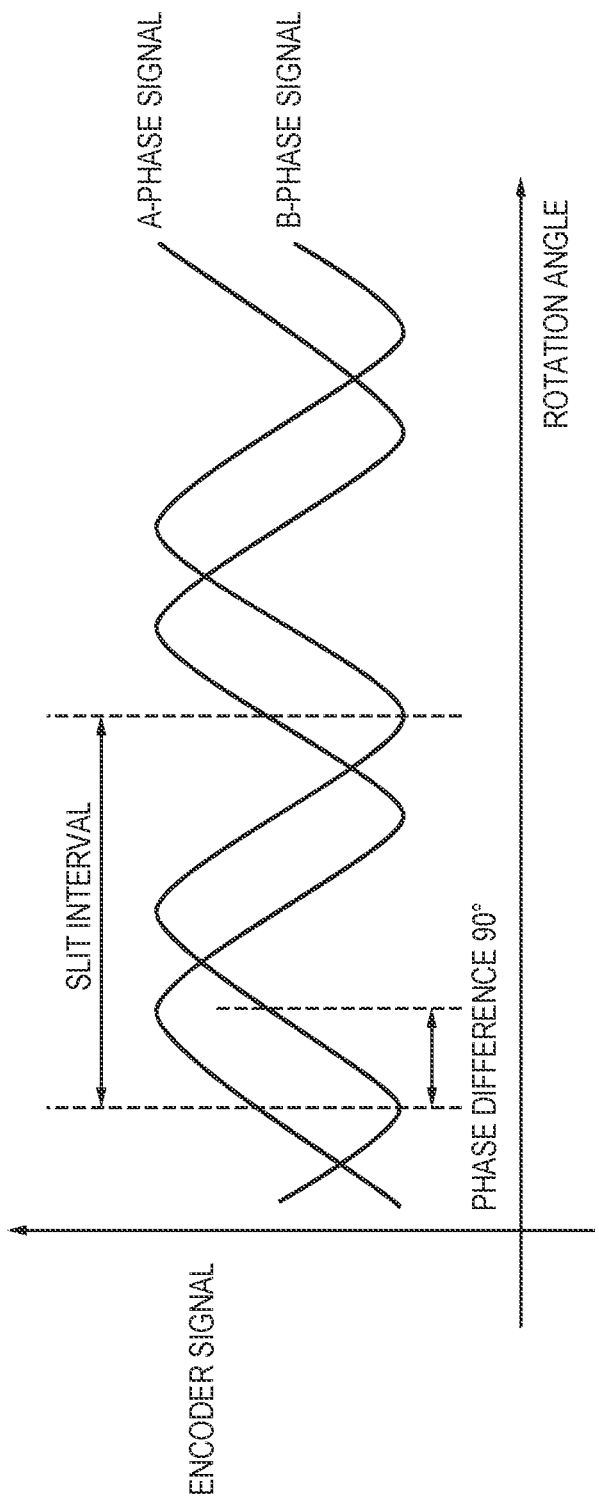
FIG. 27 is a graph for explaining two-phase encoder output signals.

FIG. 27 is a graph for explaining two-phase encoder output signals. As shown in FIG. 27, A- and B-phase signals having a 90° phase difference are generated. This corresponds to a case in which two-phase encoder signals are to be obtained, and when multiphase encoder signals are to be obtained, a plurality of fixed slits and light-receiving elements as many as the number of phases to be obtained are prepared. Note that the detection principle of the encoder is not limited to an optical type (transmission type), but other types such as an optical type using reflected light, an electrostatic type, and a magnetic type can be adopted.

A motor controller 704 controls rotation driving of the rotary motor 705. The motor controller 704 includes a driving unit required to drive the rotary motor 705 and a control unit required to control this driving unit. The motor controller 704 compares a motor rotation angle (displacement amount) as a target value with a motor detected angle (detected displacement amount) as an actually measured value, and executes feedback control so that the actually measured value equals the target value.

FIG. 1 is a control block diagram of the motor control apparatus according to the first embodiment.

A driving unit 101 supplies a predetermined driving signal 1 to the rotary motor based on an output signal from the motor controller 704 as a host control unit. The motor shaft as a movable portion 102 (target) displaces by a predetermined rotation angle when the driving signal 1 is input. This displacement amount will be referred to as a true displacement amount 2 (Xr) hereinafter. A displacement detection unit 103 (displacement amount derivation unit) detects the true displacement amount Xr of the movable portion, and outputs a detected displacement amount 3 (Xd).

FIG. 2 is a block diagram showing an example of the arrangement of the displacement detection unit according to the first embodiment. An encoder 201 which is synchronized with the movable portion 102 generates sine wave encoder signals of two phases having a 90° phase difference (A- and B-phase analog encoder signals), as shown in FIG. 27, and outputs these signals to an interpolation processing unit 202. This encoder signal does not include an ideal sine wave but includes harmonic components and nonlinear components, as indicated by an actual encoder signal (only one phase is shown) in FIG. 11. Note that the encoder 201 uses, for example, an optical encoder, but the present invention is not limited to this.

FIG. 3 is a block diagram showing an example of the arrangement of the interpolation processing unit. An analog/digital (A/D) converter 301 is used to convert two-phase analog signals of A and B phases into digital signals. In order to remove noise components included in the encoder signals before and after A/D conversion, a filter circuit and noise removal circuit are included in the interpolation processing unit 202. Note that the arrangements of the filter circuit and noise removal circuit can use known ones, and a detailed description thereof will not be given.

An area determination unit 302 determines in which of eight areas (phase ranges) each of the A- and B-phase encoder signals is located based on comparison results with respective reference values and those between absolute values with respect to A- and B-phase reference values. These areas are expressed by angle values for interpolation processing, which specify an encoder slit interval as 360°, and one area is 45° (=360°/8). The same applies to angle values to be described hereinafter. Also, the area determination unit 302 outputs data having a smaller absolute value of the encoder signal values as X data, and data having a larger absolute value as Y data.

An arctangent calculation unit 303 (relative angle value derivation unit) calculates an arctangent value (arctan) based on the encoder signal values within a range (that is, 0° to 45°) of each area determined by the area determination unit 302. The arctangent calculation unit 303 calculates arctan(X/Y), thereby outputting angle data (0° to 45°) as a relative angle value within the determined area range. Note that the input data may be converted into an angle value by looking up a lookup table (LUT) in place of the arctangent calculation.

An angle conversion unit 304 (angle value derivation unit) converts the angle calculated by the arctangent calculation unit 303 into an angle value (absolute angle value) within a range from 0° to 360° in accordance with the angle value within the range from 0° to 45° calculated by the arctangent calculation unit 303 and the area information (eight divided) by the area determination unit 302. The angle conversion unit 304 outputs the conversion result as an interpolated displacement amount Xm (interpolated displacement amount 6).

In this way, the displacement detection unit calculates an angle value from encoder signals. The angle calculation by the arctangent calculation unit 303 is executed under the assumption that the encoder signals are ideal sine waves. For this reason, when the arctangent calculation is applied to encoder signals which actually contain harmonic components and nonlinear components, the interpolated displacement amount Xm generates a detection error Xe with respect to the true displacement amount Xr.

Therefore, in the first embodiment, in order to improve the detection precision of the displacement detection unit 103, the detection error Xe is calculated, and a correction unit 203 corrects the interpolated displacement amount Xm. Thus, the detection error included in the detected displacement amount Xd is reduced.

Figure 11:
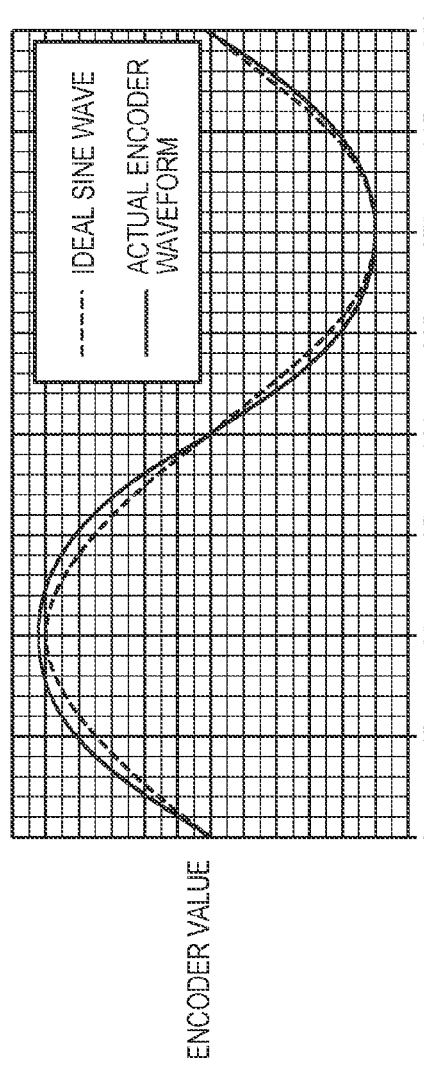
FIG. 11 is a graph exemplarily showing an ideal encoder signal waveform (sine wave) and actual encoder signal waveform.
Figure 13:
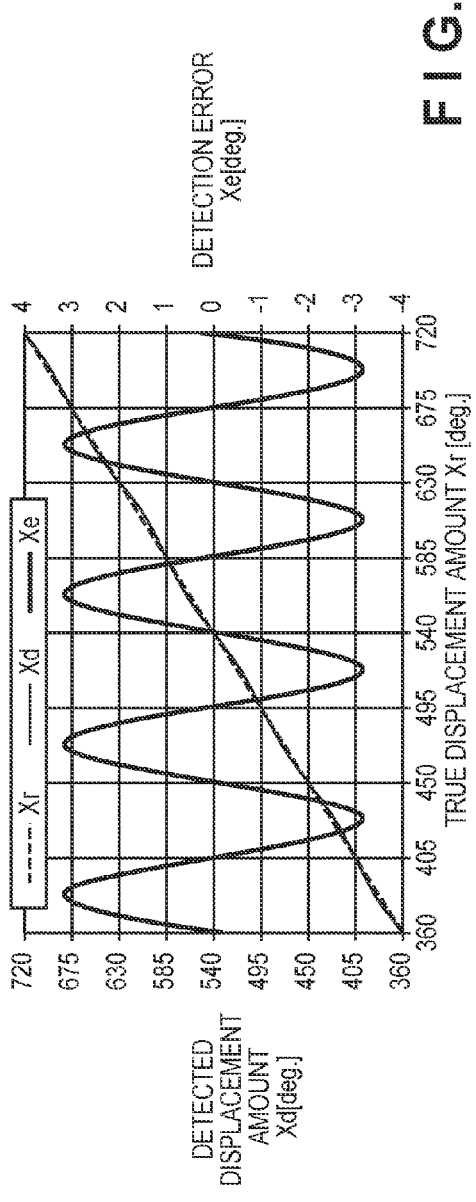
FIG. 13 is a graph exemplarily showing a detected displacement amount Xd and detection error Xe with respect to the true displacement amount Xr.

FIG. 11 is a graph exemplarily showing an ideal encoder signal waveform (sine wave) and actual encoder signal waveform. Also, FIG. 13 is a graph exemplarily showing the detected displacement amount Xd and detection error Xe with respect to the true displacement amount Xr when the actual encoder signal waveform shown in FIG. 11 is input. More specifically, FIG. 13 exemplarily shows the detected displacement amount Xd when the true displacement amount Xr changes from 360° to 720°. Also, FIG. 13 shows the detected displacement amount Xd and detection error Xe together when the interpolated displacement amount Xm is output intact as the detected displacement amount Xd without any correction. Note that the detection error Xe is a difference between the true displacement amount Xr and detected displacement amount Xd.

Due to the influence of the displacement detection error caused by harmonic components and nonlinear components included in the actual encoder signal, the detected displacement amount Xd does not become linear with respect to the true displacement amount Xr (that is, it is expressed by a curve on the graph). Note that if the encoder signal is an ideal sine wave, no displacement detection error is generated, and the true displacement amount Xr and detected displacement amount Xd become linear (that is, they are expressed by lines on the graph).

As can be seen from a change in detection error Xe shown in FIG. 13, the detection error Xe depends on the true displacement amount Xr, and causes a fluctuation for four periods within one encoder slit interval (360 [deg]). Then, the detection error Xe generates an error of a maximum of about 3 [deg]. However, this is a characteristic example when the encoder signal has the encoder waveform shown in FIG. 11, and the present invention is not limited to this. Note that when harmonics are main fluctuation causes, the fluctuation period is $1/2^N$ (N is a positive integer) of one period of a displacement amount indicated by the encoder signal.

Figure 15:
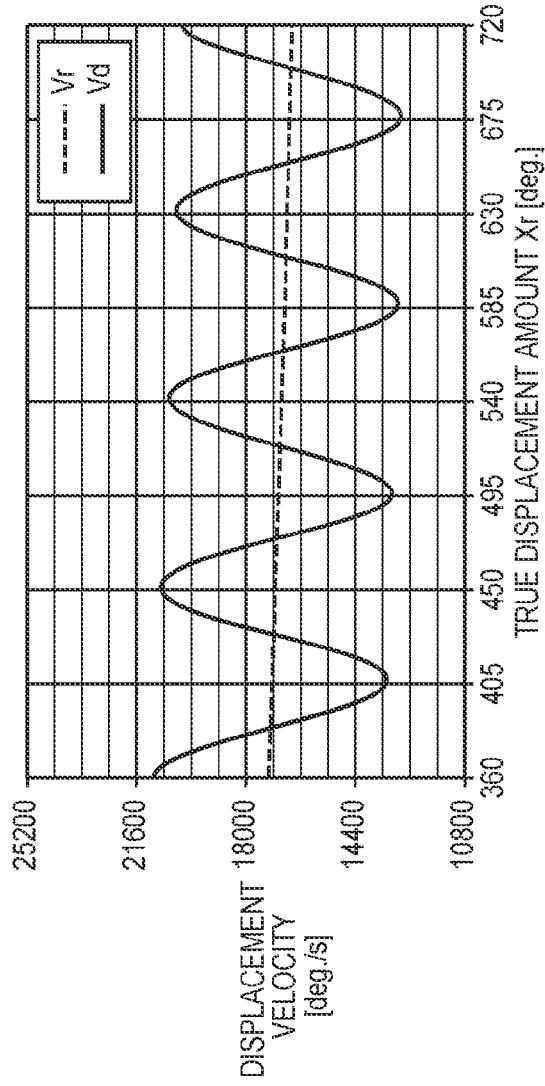
FIG. 15 is a graph exemplarily showing the true displacement velocity Vr and detected displacement velocity Vd with respect to the true displacement amount Xr.

FIG. 4 is a block diagram showing an example of the arrangement of a displacement velocity detection unit. A displacement velocity detection unit 104 (displacement velocity derivation unit) includes a differentiator 401 which makes a differential calculation required to calculate a detected displacement velocity Vd (detected displacement velocity 4). In the first embodiment, calculation processing is executed based on this detected displacement velocity Vd to calculate the detection error Xe. Practical processing of the calculation of the detection error Xe will be described later. The differentiator 401 calculates a temporal differential value (Xd/dt) of the detected displacement amount Xd detected by the displacement detection unit 103. Hence, the detected displacement velocity Vd is different from a true displacement velocity Vr of the movable portion under the influence of the detection error Xe contained in the detected displacement amount Xd. FIG. 15 is a graph exemplarily showing the true displacement velocity Vr and detected displacement velocity Vd with respect to the true displacement amount Xr when the actual encoder signal waveform shown in FIG. 11 is input.

<Arrangement of Correction Value Generation Unit (Correction Value Derivation Apparatus and Correction Value Derivation Unit)>

Figure 5:
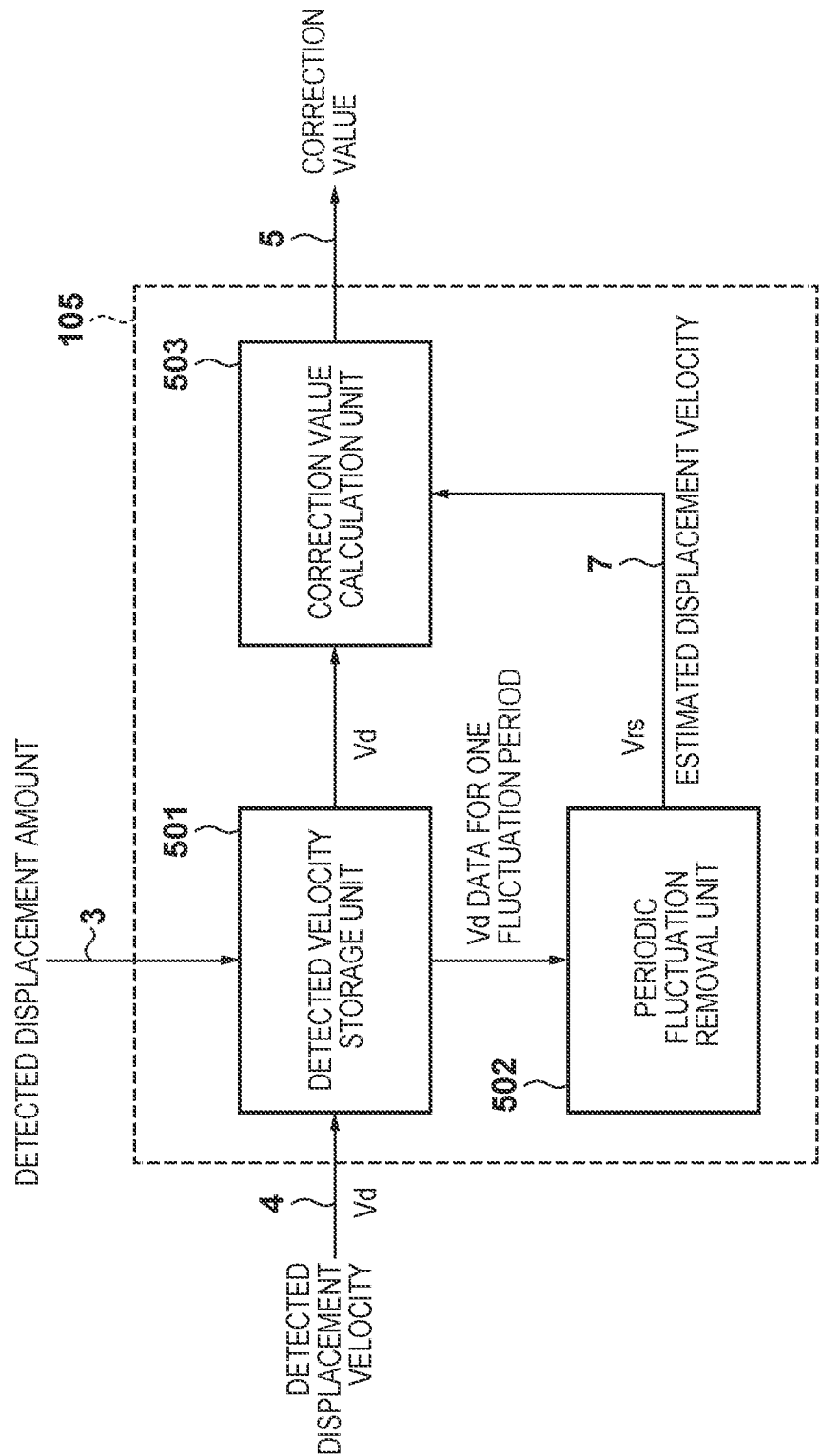
FIG. 5 is a block diagram showing an example of the arrangement of a correction value generation unit.

FIG. 5 is a block diagram showing an example of the arrangement of a correction value generation unit. The input detected displacement velocity Vd is stored in a detected velocity storage unit 501 at a constant detected displacement amount interval. The detected velocity storage unit 501 stores data for one fluctuation period of the detected displacement amount Xd.

A periodic fluctuation removal unit 502 (average displacement velocity calculation unit) is arranged to remove periodic fluctuation components from the detected displacement velocity data stored in the detected velocity storage unit 501 so as to calculate an estimated displacement velocity Vrs as an estimated value of the true displacement velocity Vr. More specifically, the estimated displacement velocity Vrs can be calculated by calculating an average of the detected displacement velocities stored in the detected velocity storage unit 501 over a predetermined displacement range, for example, an average for one fluctuation period (½ periods before and after a given value).

A correction value calculation unit 503 calculates a correction value to reduce a difference between the detected displacement velocity Vd and estimated displacement velocity Vrs. More specifically, a value obtained by integrating fluctuation ratios of the detected displacement velocities Vd with respect to the estimated displacement velocity Vrs is calculated as a detection error (calculation error Xec). Then, the value of the calculation error Xec is converted into a value corresponding to the arrangement of the displacement detection unit 103, and is output to the displacement detection unit 103. However, in the first embodiment, the calculation error Xec corresponding to the detected displacement amount Xd is used as a correction value 5, and no value conversion is especially executed.

FIG. 6 is a block diagram showing an example of the arrangement of a correction unit. Reference numeral 600a denotes an arrangement example using a correction error LUT; and 600b, an arrangement example using a correction angle LUT.

In the arrangement example 600a, a correction error LUT 601 outputs the calculation error Xec as a correction amount in accordance with the value of the interpolated displacement amount Xm. The interpolated displacement amount Xm upon generation of this correction error LUT 601 is the detected displacement amount Xd used upon calculation of the correction value 5.

The detected displacement amount Xd output from the correction unit 203 assumes a value obtained by subtracting the calculation error Xec from the interpolated displacement amount Xm. As a result, correction can be made to remove the detection error Xe included in the interpolated displacement amount Xm, so that the detected displacement amount Xd detected by the displacement detection unit 103 gets closer to the true displacement amount Xr of the movable portion 102. In this case, since the detection error Xe is removed, the detected displacement velocity Vd becomes free from any fluctuations, and a difference between the detected displacement velocity Vd and the estimated displacement velocity Vrs calculated by the correction value generation unit 105 can be reduced.

Note that in the arrangement example 600b, a value Xm-Xe is used in a correction angle LUT 701 to omit the subtraction processing required for the arrangement 600a.

<Calculation of Calculation Error Xec>

The relationship among a true displacement amount Xr(t), detected displacement amount Xd(t), true displacement velocity Vr(t), detected displacement velocity Vd(t), and detection error Xe(Xr(t)), and a derivation method of the calculation error Xec(Xd(t)) will be described below. Also, in order to define which values are to be used in functions of respective values as variables, variables will also be specified.

Assume that when the movable portion is driven, a true displacement amount Xr(t) is generated with respect to a certain time t. When this displacement is detected by the encoder, a detection error Xe(Xr(t)) depending on the true displacement amount Xr(t) is generated, as described above with reference to FIG. 13. Hence, a detected displacement amount Xd(t) is expressed by:

$$Xd(t)=Xr(t)+Xe(Xr(t)) \quad (1)$$

When the two sides of equation (1) are differentiated by the time t, we have:

$$Vd(t) = Vr(t) \times \left\{ 1 + \frac{d}{dXr} Xe(Xr(t)) \right\} \quad (2)$$

Note that a detected displacement velocity Vd(t) is obtained by temporally differentiating the detected displacement amount Xd(t), and a true displacement velocity Vr(t) is obtained by temporally differentiating the true displacement amount Xr(t). Also, dXe(Xr(t))/dXr expresses a displacement amount differential value of the detection error Xe(Xr(t)), and equation (2) can be rewritten to:

$$\frac{d}{dXr} Xe(Xr(t)) = \frac{Vd(t)}{Vr(t)} - 1 \quad (3)$$

Hence, as can be seen from the above description, when the true displacement velocity Vr(t) can be detected, the differential value dXe(Xr(t))/dXr of the detection error can be calculated.

The detection error Xe(Xr(t)) changes periodically with respect to the true displacement amount Xr(t), and when the detection error is integrated by one fluctuation period, it becomes zero. Therefore, by calculating an average for one fluctuation period (½ periods before and after a given value) in equation (1), the influence of the detection error Xe(Xr(t)) can be removed. The same applies to the velocity, and an estimated displacement velocity Vrs(t) as an estimated value of the true displacement velocity Vr is calculated by approximation using:

$$Vr(t) \cong Vrs(t) = \frac{1}{2X\alpha} \times \int_{-X\alpha}^{X\alpha} Vd(Xd) dXd \quad (4)$$

where Vrs(t) is an estimated displacement velocity in case of the detected displacement amount Xd(t), and an integral range from $-X\alpha$ to $X\alpha$ is one fluctuation period having Xd(t) as the center. Also, Vd(Xd) is a detected displacement velocity when the detected displacement amount is Xd.

Furthermore, in equation (3), a small displacement amount dXr is replaced by a small detected displacement amount dXd by approximation, and the true displacement amount Xr(t) is further replaced by an estimated displacement amount Xrs(t). Then, a value obtained by multiplying the two sides by dXd and integrating the products can be obtained as a calculation error Xec(Xd(t)) by:

$$Xe(Xd(t)) \cong Xec(Xd(t)) = \int_0^{Xd(t)} \left( \frac{Vd(Xd)}{Vrs(Xd)} - 1 \right) dXd \quad (5)$$

where Vrs(Xd) is an estimated displacement velocity in case of the detected displacement amount Xd. As described above, the detection error Xe and calculation error Xec can be calculated from the detected velocity Vd.

<Correction of Displacement Detection>

Figure 12:
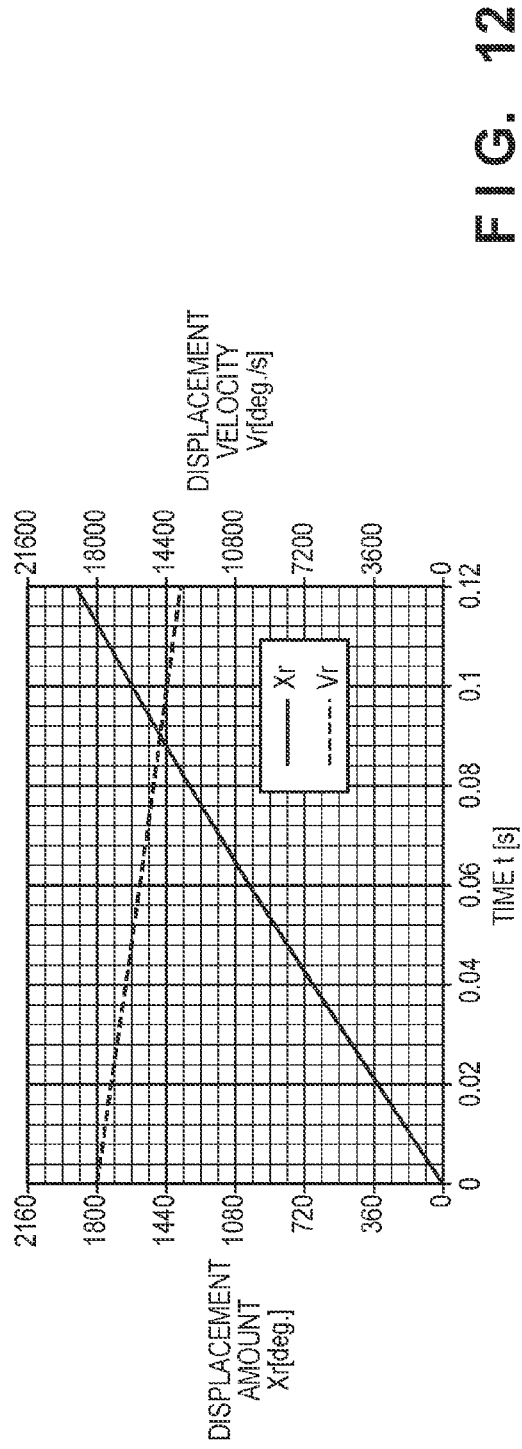
FIG. 12 is a graph exemplarily showing time dependencies of a true displacement amount Xr and true displacement velocity Vr of a movable portion.

FIG. 12 is a graph exemplarily showing time dependencies of the true displacement amount Xr and true displacement velocity Vr of the movable portion. More specifically, FIG. 12 shows a case in which an initial velocity is 18,000 [deg/s], and an acceleration is decelerated at 36,000 [deg/s$^2$]. A case will be assumed wherein the true displacement velocity Vr of the movable portion 102 (rotary motor) is not constant, as shown in FIG. 12.

Note that the following description will be given under the assumption that the encoder signal is an actual encoder signal waveform exemplified in FIG. 11. Also, an angle value used in the following description is not an actual displacement amount (rotation angle) of the movable portion 102 but is an angle value after interpolation processing when the encoder slit interval is specified as 360°.

Figure 14:
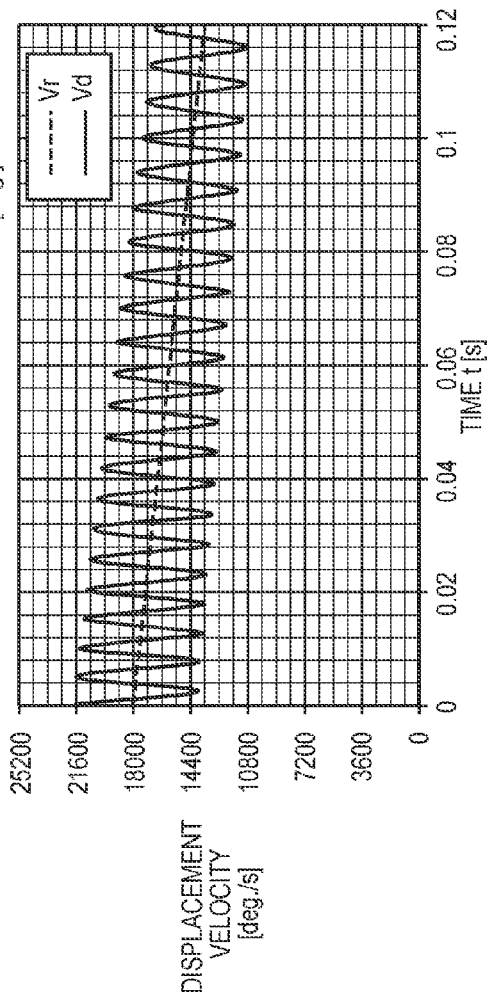
FIG. 14 is a graph exemplarily showing time dependencies of the true displacement velocity Vr and a detected displacement velocity Vd.

FIG. 14 is a graph exemplarily showing time dependencies of the true displacement velocity Vr and detected displacement velocity Vd. The detected velocity Vd corresponding to the differential value of the detected displacement amount Xd is influenced by the detection error Xe. As a result, as shown in FIGS. 14 and 15, a velocity fluctuation (detected velocity nonuniformity) apparently occurs. As described above with reference to FIG. 13, the detection error Xe depends on the true displacement amount Xr. For this reason, the detected displacement velocity Vd periodically varies with respect to the true displacement amount Xr as in the detected displacement amount Xd.

Hence, the first embodiment uses an estimated displacement velocity Vrs obtained by averaging the detected displacement velocities Vd in place of the true displacement velocity Vr which cannot be detected directly. Then, the detected displacement amount Xd is corrected to reduce a difference between the estimated displacement velocity Vrs and detected displacement velocity Vd and to suppress a periodic velocity fluctuation (detected velocity nonuniformity).

Figure 16:
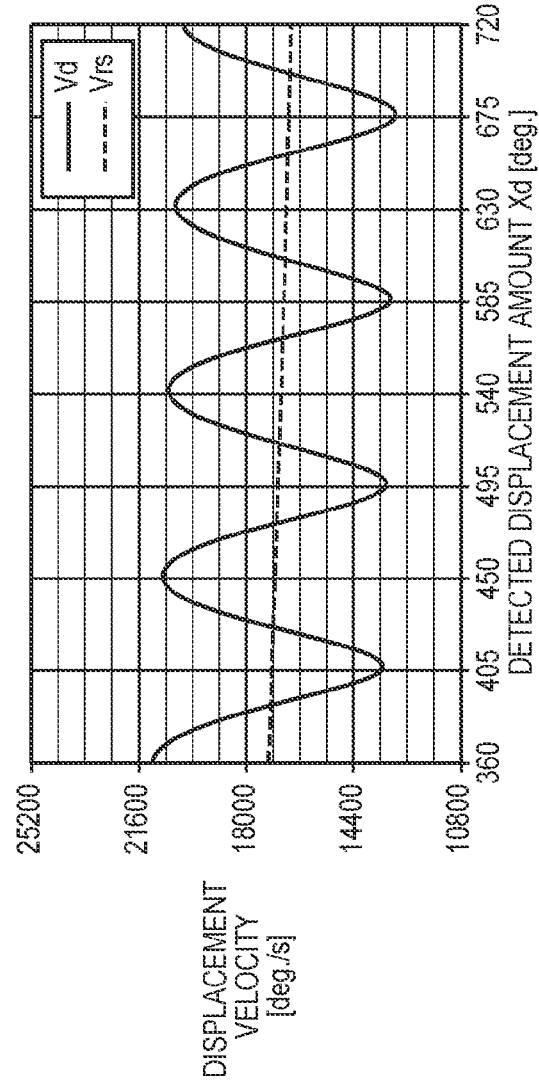
FIG. 16 is a graph exemplarily showing the detected displacement velocity Vd and an estimated displacement velocity Vrs with respect to the detected displacement amount Xd.

FIG. 16 is a graph exemplarily showing the detected displacement velocity Vd and estimated displacement velocity Vrs with respect to the detected displacement amount Xd. In the arrangement example of the first embodiment, detected amounts which can be directly acquired are only the detected displacement amount Xd and detected displacement velocity Vd.

The estimated displacement velocity Vrs is calculated as an average value (detected displacement amount space) of the detected displacement velocities Vd for one fluctuation period (½ periods before and after a given value). For example, an average value of detected displacement velocities Vd obtained at 1.40625° intervals in a section in which the detected displacement amounts Xd are 495° to 585° (=540°±45°) is used as the estimated displacement velocity when the detected displacement amount Xd=540°. A periodic fluctuation is removed from the estimated displacement velocity Vrs calculated in this way, as indicated by a dotted line in FIG. 16, and the estimated displacement velocity Vrs assumes a value which can be approximated to the true displacement velocity Vr.

Figure 17:
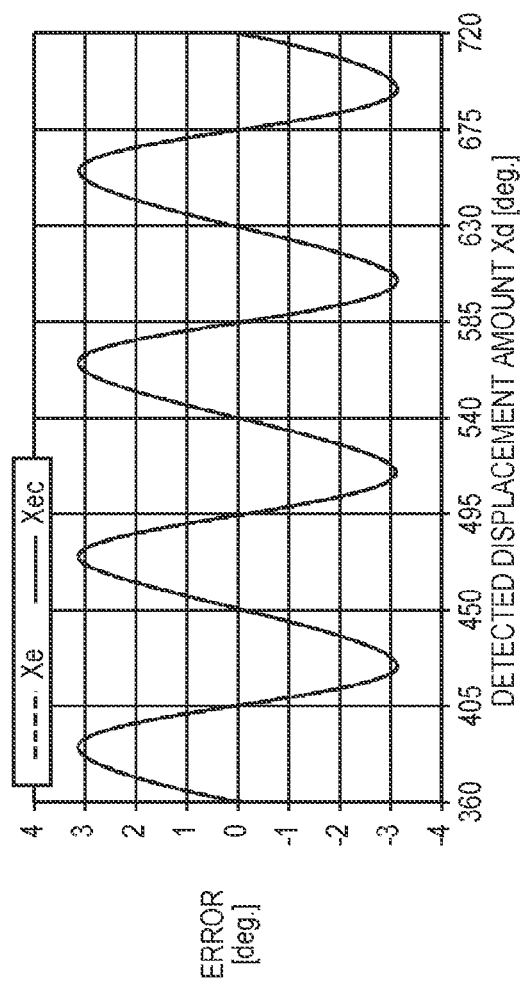
FIG. 17 is a graph exemplarily showing the detection error Xe and a calculation error Xec with respect to the detected displacement amount Xd.

FIG. 17 is a graph exemplarily showing the detection error Xe and calculation error Xec with respect to the detected displacement amount Xd. More specifically, FIG. 17 shows a calculation result of the detection error using expression (5) based on the estimated displacement velocity Vrs and detected displacement velocity Vd. The calculated detection error (calculation error Xec) is calculated to assume nearly the same value as the detection error Xe generated by the detection unit.

When the calculation error Xec is used as a correct value, it is converted into a correction value which matches the correction unit 203. Alternatively, correction values may be calculated for all detected displacement amounts, and may be held as a correction table. Also, only correction values for a given section from, for example, 0° to 90° may be held in consideration of periodicity of the detection error Xe. The former case is particularly effective when working errors for respective slits are large, and variations of detection errors Xe are large. Alternatively, a correction value may be calculated again using a post-correction detected displacement amount Xd' which is corrected using the calculated correction value. In this case, the calculation precision of the detection error Xe can be further improved, and the correction precision of the detected displacement amount can be improved.

Figure 18:
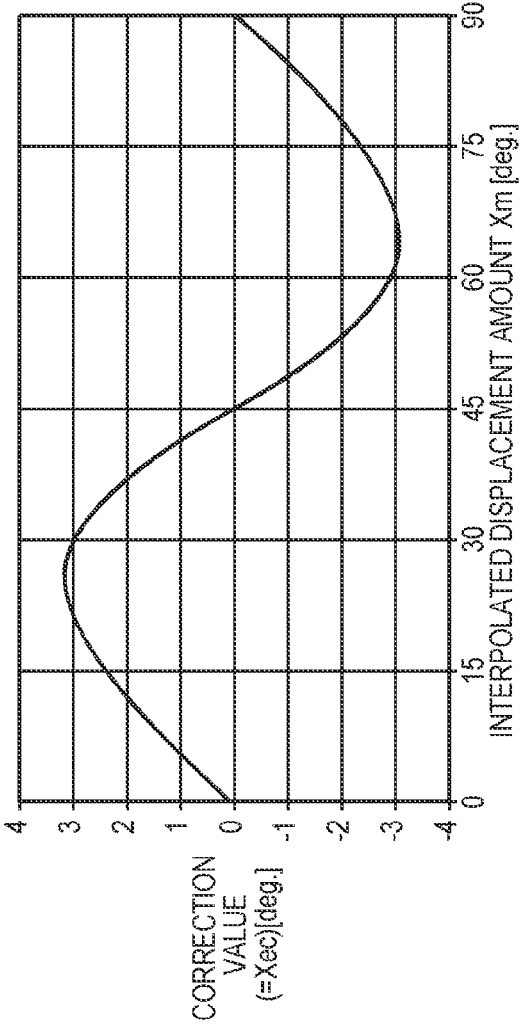
FIG. 18 is a graph exemplarily showing a corrected error LUT (correction value with respect to an interpolated displacement amount Xm)

FIG. 18 is a graph exemplarily showing the correction error LUT (a correction value with respect to the interpolated displacement amount Xm). More specifically, FIG. 18 shows a graph of values indicated by a correction value table in a section from 0° to 90°. That is, FIG. 18 corresponds to the LUT when the correction unit 203 has the arrangement 600a shown in FIG. 6.

Figure 21:
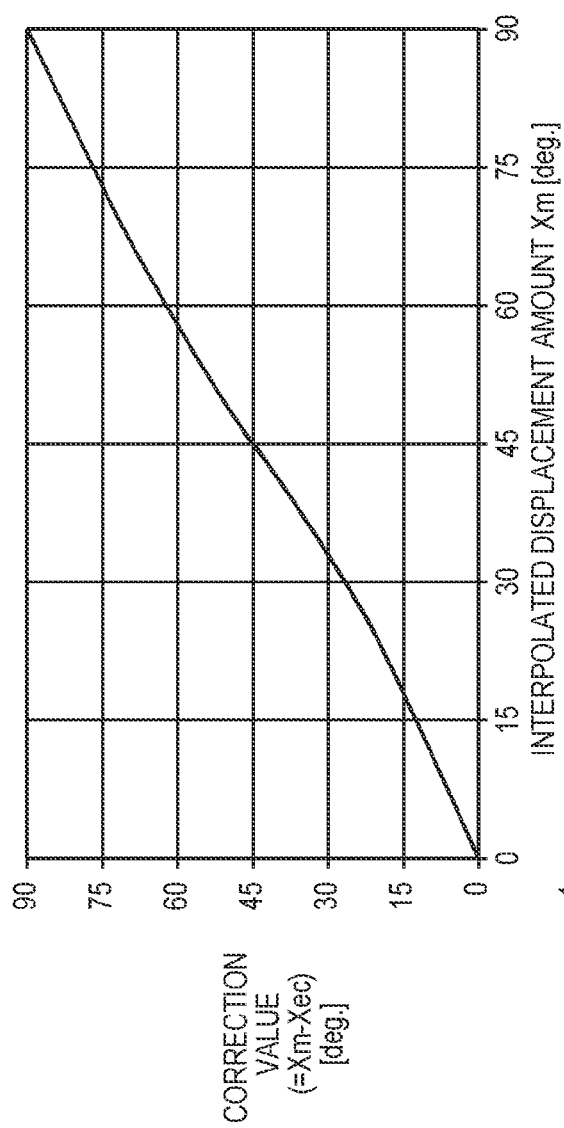
FIG. 21 is a graph exemplarily showing a corrected angle LUT (correction value with respect to the interpolated displacement amount Xm)

On the other hand, FIG. 21 is a graph exemplarily showing the correction angle LUT (a correction value with respect to the interpolated displacement amount Xm). That is, FIG. 21 corresponds to the LUT when the correction unit 203 has the arrangement 600b shown in FIG. 6. Since the value Xm-Xe is used in the correction angle LUT 701, the subtraction processing in the correction unit 203 can be omitted.

By applying correction using such correction error LUT or correction angle LUT, the detected displacement amount Xd is corrected to derive a post-correction detected displacement amount Xd' nearly equal to the true displacement amount.

Figure 19:
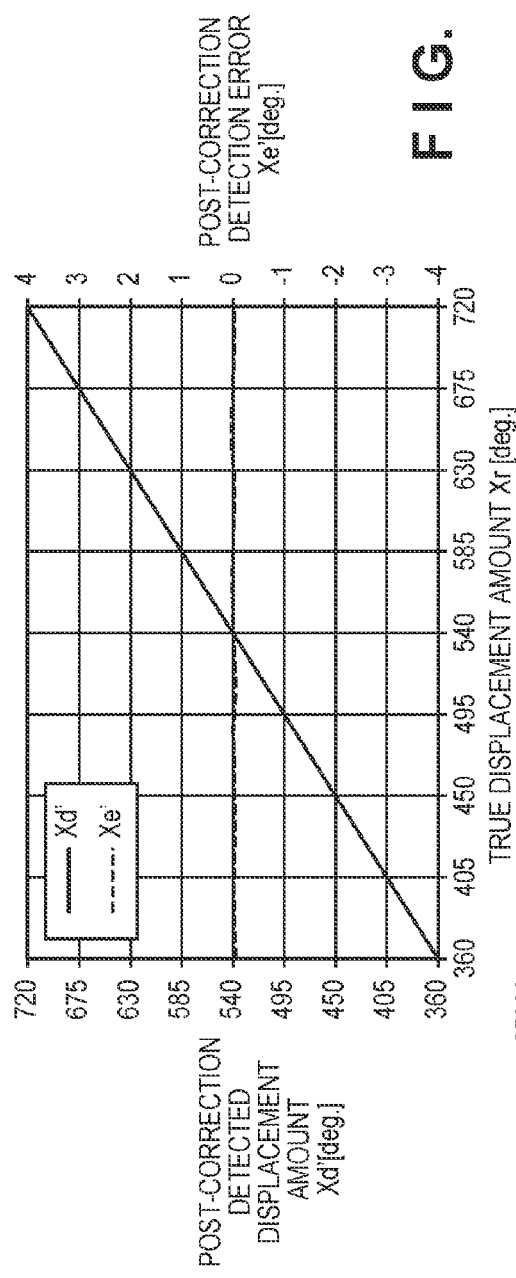
FIG. 19 is a graph exemplarily showing a post-correction detected displacement amount Xd' and post-correction detection error Xe' with respect to the true displacement amount Xr.
Figure 20:
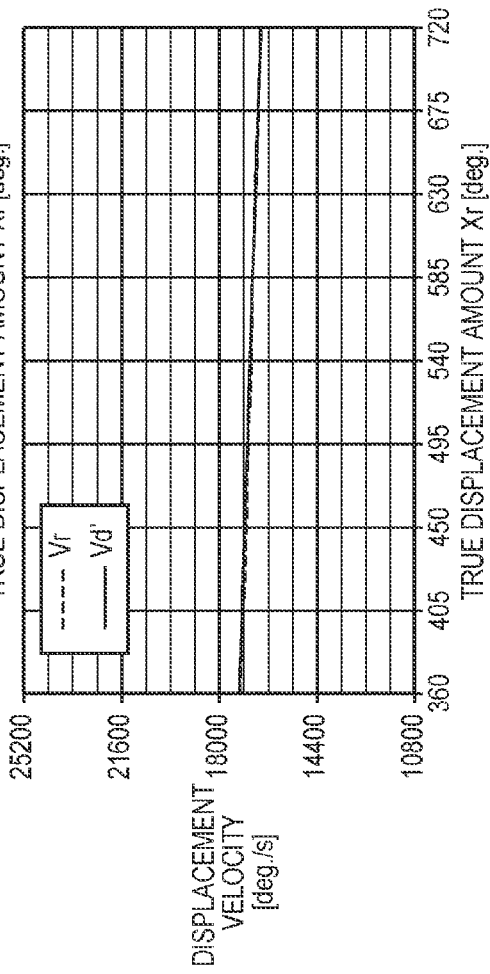
FIG. 20 is a graph exemplarily showing the true displacement velocity Vr and a corrected detected displacement velocity Vd' with respect to the true displacement amount Xr.

FIG. 19 is a graph exemplarily showing a post-correction detected displacement amount Xd' and post-correction detection error Xe' with respect to the true displacement amount Xr. Also, FIG. 20 is a graph exemplarily showing the true displacement velocity Vr and a corrected detected displacement velocity Vd' with respect to the true displacement amount Vr. As can be seen from FIGS. 19 and 20, an error is greatly reduced in the post-correction detected displacement amount Xd'.

As described above, according to the first embodiment, detection errors caused by harmonic components and nonlinear components included in an encoder output signal can be suitably corrected. Especially, since an average is calculated in association with an angle range corresponding to one change period of the displacement amount, a correction value can be suitably calculated even under the velocity fluctuation (motor velocity nonuniformity), thus providing a great advantage.

By executing the aforementioned angle correction, in the motor control apparatus, even when the rotation velocity of the motor is not constant, the division precision of the encoder can be improved by a simpler arrangement. That is, no dedicated high-precision constant velocity driving control such as a so-called calibration mode is required, and suitable correction can be executed in real time even under the velocity fluctuations.

Note that the present invention is not limited to the aforementioned arrangements and calculation formulas, and changes can be made as needed without departing from the technical scope of the present invention. For example, in the above description, the rotary motor is used as the movable portion. In place of the rotary motor, a direct operation mechanism may be used. As a driving unit, actuators such as a motor and piezo element may be used. Also, the displacement velocity detection unit may be configured to measure a pulse width of a pulse signal which is output from the displacement detection unit according to the detected displacement amount.

Second Embodiment

The second embodiment will explain another arrangement of a displacement detection unit 103. More specifically, correction processing is executed in interpolation processing unlike in the first embodiment. Differences from the first embodiment will be mainly described below.

<Arrangement of Displacement Detection Unit>

Figure 8:
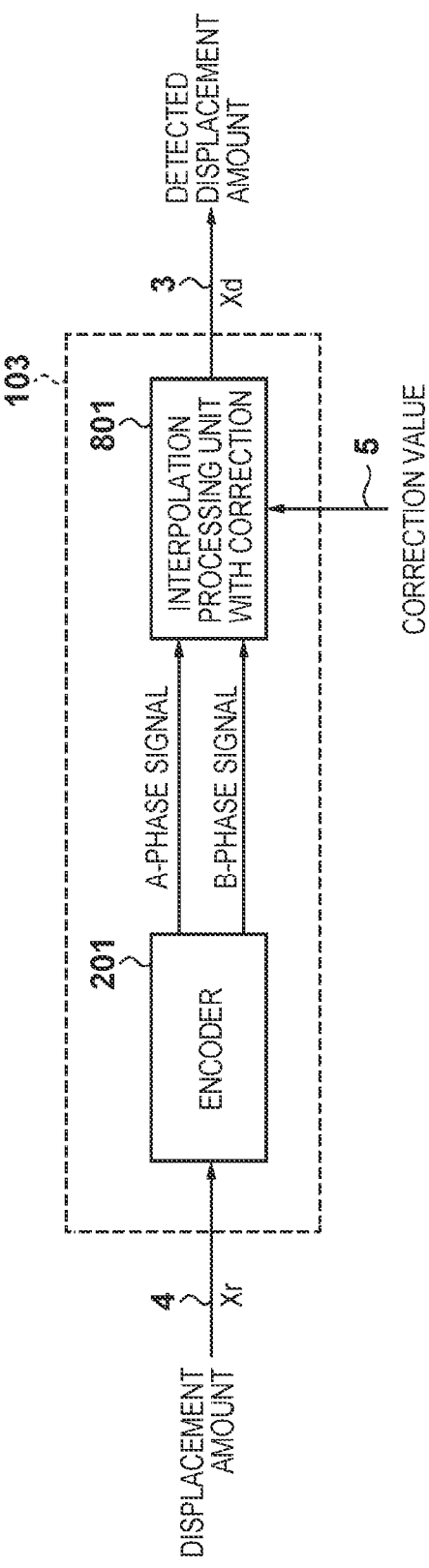
FIG. 8 is a block diagram showing an example of the arrangement of a displacement detection unit according to the second embodiment.

FIG. 8 is a block diagram showing an example of the arrangement of a displacement detection unit according to the second embodiment. A displacement detection unit 103 detects a true displacement amount Xr of a movable portion, and outputs a detected displacement amount Xd. An encoder 201, which is synchronized with a movable portion 102, generates encoder signals shown in FIG. 27 in accordance with the true displacement amount Xr, and outputs these signals to an interpolation processing unit 801 with correction.

FIG. 9 is a block diagram showing an example of the arrangement of the interpolation processing unit with correction. An analog/digital (A/D) converter 301 is used to convert two-phase analog signals of A and B phases into digital signals. An area determination unit 302 determines in which of eight areas (phase ranges) each of the A- and B-phase encoder signals is located based on comparison results with respective reference values and those between absolute values with respect to A- and B-phase reference values. A correction/arctangent calculation unit 901 calculates an arctangent value (arctan) based on encoder signal values within a range (that is, 0° to 45°) of each area determined by the area determination unit 302. However, unlike in the arctangent calculation unit 303 of the first embodiment, an arctangent LUT 1002 is changed based on a correction value input from an external unit (for example, a correction value calculation unit) to execute angle correction.

FIG. 10 is a block diagram showing an example of the arrangement of the correction/arctangent calculation unit. A tangent calculation unit 1001 calculates a tangent value X/Y (tangent value 9), and outputs the calculated value to the arctangent LUT 1002. The arctangent LUT 1002 looks up a lookup table to obtain an arctangent value corresponding to the input tangent value X/Y, and outputs a post-area determination detected displacement amount Xda as a post-area determination detected displacement amount 8 to an angle conversion unit 304. The tangent value X/Y output from the tangent calculation unit 1001 ranges from 0 to 1, and the post-area determination detected displacement amount Xda output from the arctangent LUT 1002 ranges from 0° to 45°.

Figure 22:
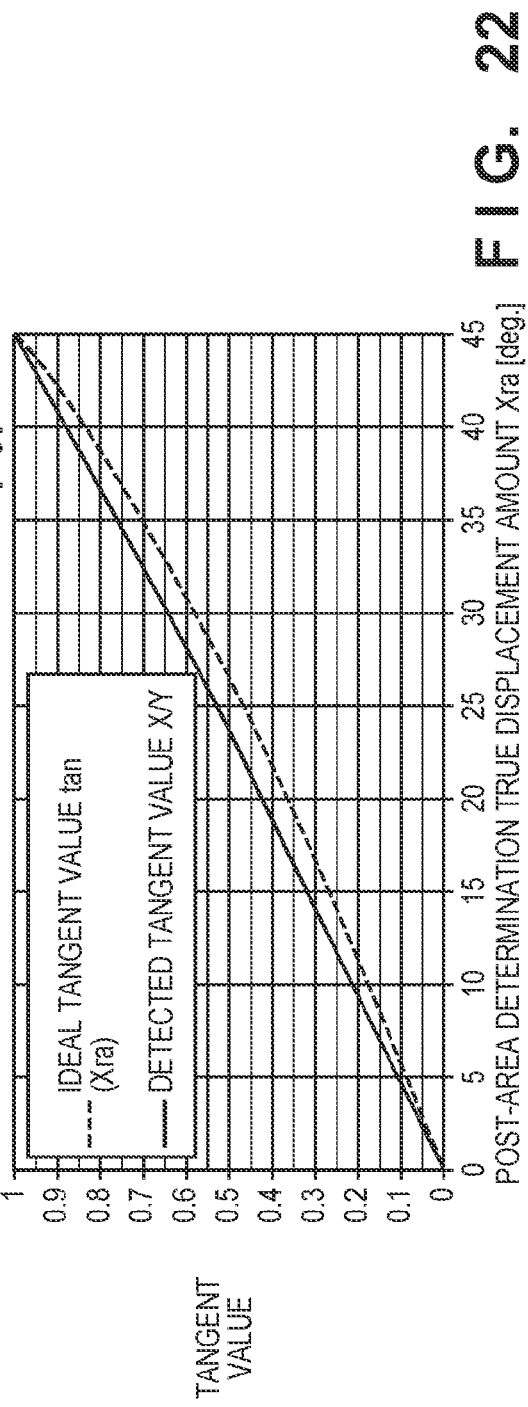
FIG. 22 is a graph exemplarily showing an ideal tangent value tan(Xra) and detected tangent value X/Y with respect to a true displacement amount Xra after area determination.

FIG. 22 is a graph exemplarily showing an ideal tangent vale tan(Xra) and detected tangent value X/Y with respect to a true displacement amount Xra after area determination. As described above in the first embodiment, an actual encoder signal contains harmonic components and nonlinear components. For this reason, a detected tangent value X/Y actually output from the tangent calculation unit 1001 does not become an ideal tangent value tan(Xra) with respect to the true displacement amount Xra after area determination. Hence, when an ideal arctangent conversion table generated based on angle values ranging from 0° to 45° and their ideal tangent values is used in the arctangent LUT 1002, if an angle value is referred to based on the input detected tangent value X/Y, a detection error is generated.

Figure 23:
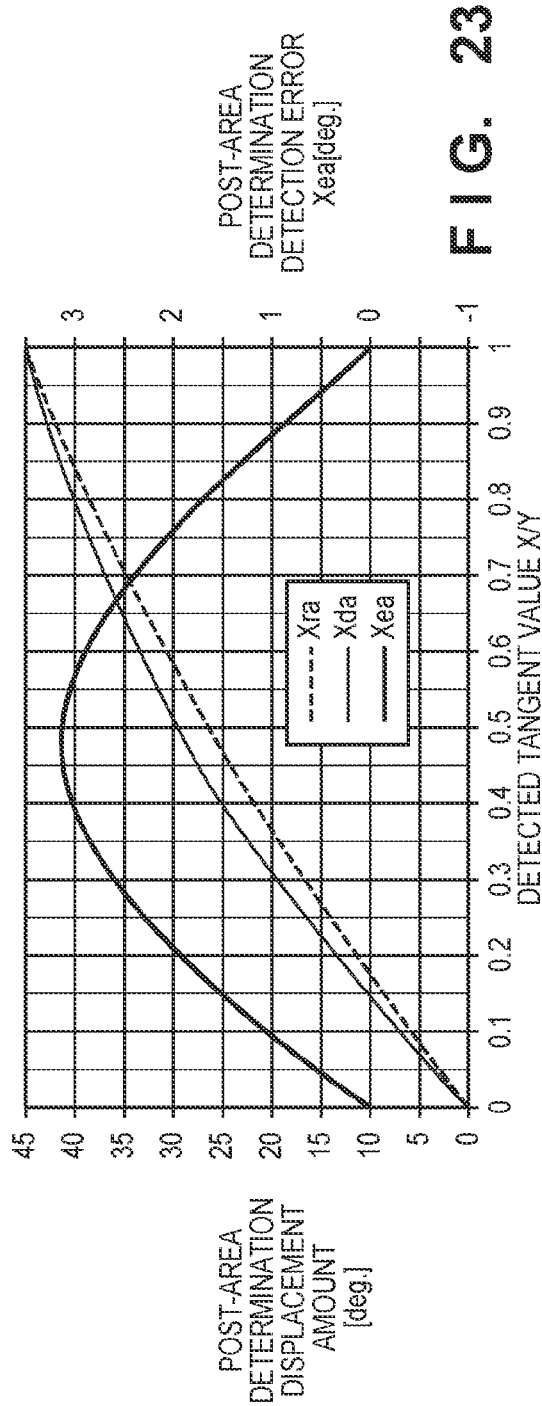
FIG. 23 is a graph showing a post-area determination detection error Xea with respect to the detected tangent value X/Y.

FIG. 23 is a graph showing a post-area determination detection error Xea with respect to the detected tangent value X/Y. More specifically, the arctangent LUT 1002 outputs the post-area determination detected displacement amount Xda including the post-area determination detection error Xea with respect to the true displacement amount Xra, as indicated by a dotted curve in FIG. 23.

Hence, in the second embodiment, in order to improve the detection precision of the displacement detection unit 103, an arctangent conversion table in the arctangent LUT 1002 is configured in advance in correspondence with the characteristics of the encoder signal. Thus, the post-area determination detected displacement amount Xda to be output is corrected, thereby reducing an error included in the post-area determination detected displacement amount Xda.

The post-area determination detected displacement amount Xda output from the correction/arctangent calculation unit 901 is converted into an angle value within a range from 0° to 360° by the angle conversion unit 304. The interpolation processing unit 801 with correction decides and outputs a detected displacement amount Xd with respect to the angle value output from the angle conversion unit 304.

Note that the arrangement of a correction value calculation unit 503 used to derive a correction value is basically the same as that in the first embodiment. However, the correction value calculation unit 503 may convert a derived correction value into a format corresponding to the arctangent LUT 1002 if necessary, and may output the converted value to the arctangent LUT 1002.

<Correction of Displacement Detection>

Correction of displacement detection by the arctangent LUT 1002 will be described below taking practical examples. Note that the calculation of the detection error Xe is the same as that in the first embodiment, and a description thereof will not be repeated.

When an encoder slit interval (360°) is divided into 256 by interpolation processing, an output from the correction/arctangent calculation unit 901 requires a resolution of 1.40625° (=360°/256). Table values expressed by an input value LUTin (=X/Y) and output value LUTout (=Xda) of the arctangent LUT 1002 used in this case are respectively expressed by:

$$LUTout\,(=Xda) = \frac{45}{32} \times n \tag{6}$$

$$LUTin\left(=\frac{X}{Y}\right) = \tan(Xda) \tag{7}$$

where n is an integer ranging from 0 to 32, an input range ranges from 0 to 1, and an output range ranges from 0° to 45°.

Figure 24:
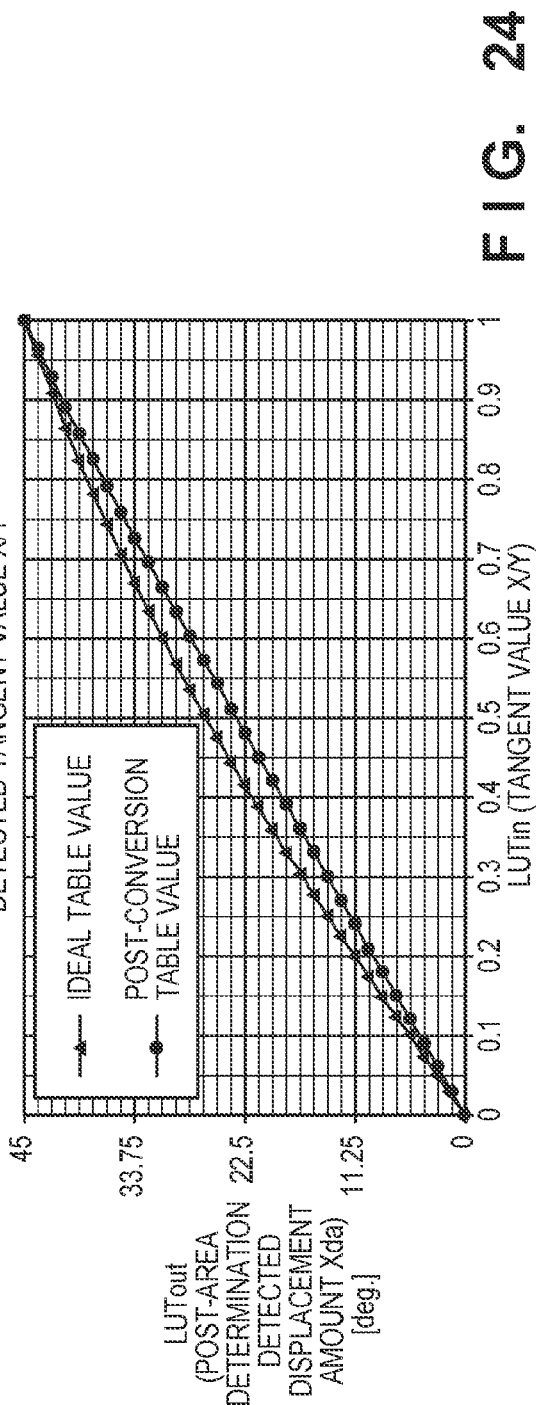
FIG. 24 is a graph exemplarily showing an ideal table value and converted table value in an arctangent LUT.

FIG. 24 is a graph exemplarily showing an ideal table value and post-conversion table value in the arctangent LUT. Note that the ideal table value means a table value suitable for an ideal encoder signal. On the other hand, the post-conversion table value is an LUT which is corrected based on a correction value input from an external unit (for example, the correction value calculation unit). That is, as described above, in the second embodiment, in order to remove the post-area determination detection error Xea included in the post-area determination detected displacement amount Xda, the arctangent LUT 1002 is changed to a suitable table using a calculation error Xec.

Figures 25, 26:
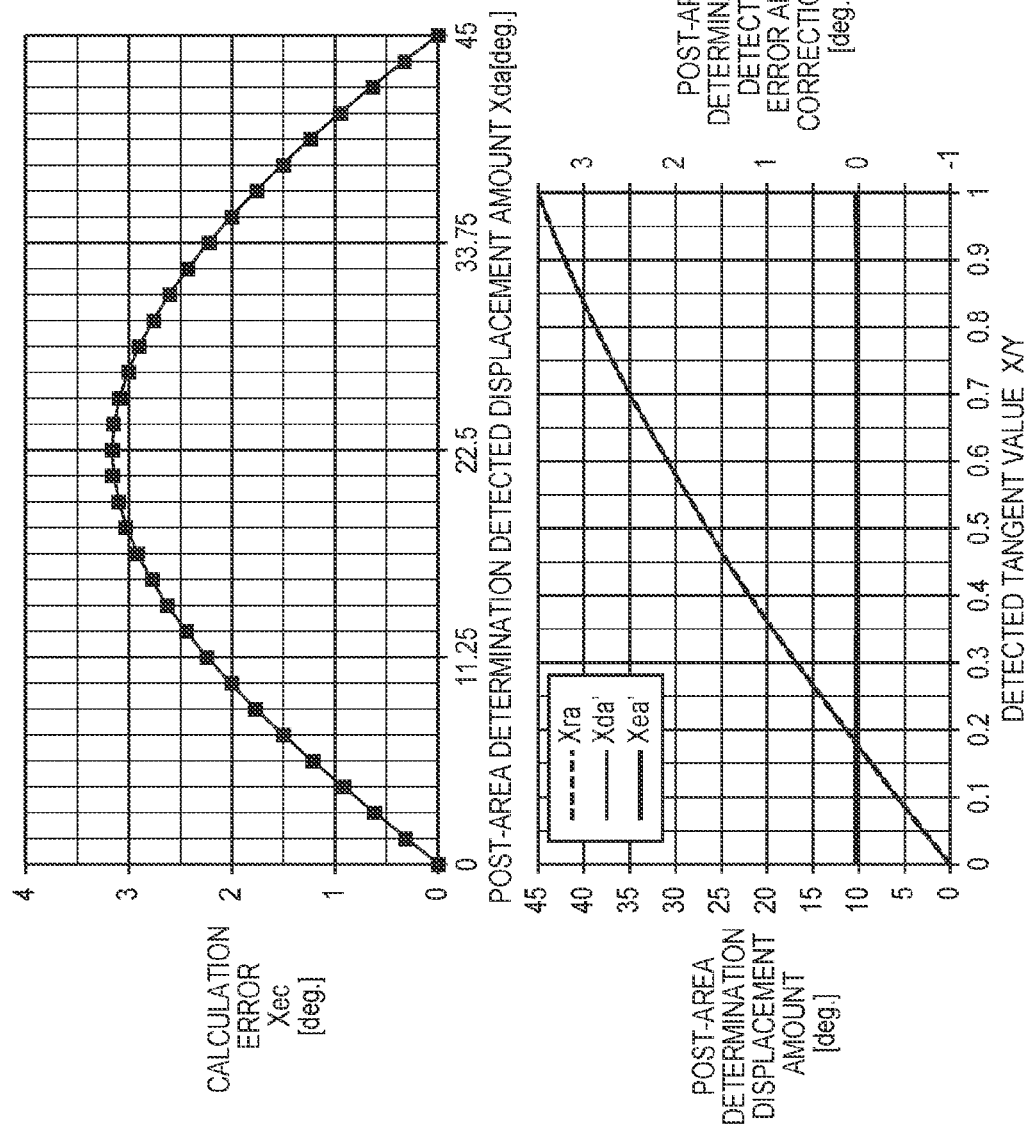
FIG. 25 is a graph exemplarily showing the calculation error Xec with respect to the post-area determination detected displacement amount Xda.
FIG. 26 is a graph exemplarily showing a corrected post-area determination detection error Xea' with respect to the detected tangent value X/Y.

FIG. 25 is a graph exemplarily showing the calculation error Xec with respect to the post-area determination detected displacement amount Xda. More specifically, FIG. 25 shows the relationship between the post-area determination detected displacement amount Xda output from the arctangent LUT 1002 and the calculated calculation error Xec.

The post-area determination detected displacement amount Xda in this case is a value before angle conversion, which is calculated based on the detected displacement amount Xd in consideration of the operation of the angle conversion unit 304, and ranges from 0° to 45°. For example, when the detected displacement amount Xd assumes a value ranging from 0° to 45°, the post-area determination detected displacement amount Xda and detected displacement amount Xd assume the same value; when the detected displacement amount Xd assumes a value ranging from 45° to 90°, the post-area determination detected displacement amount Xda assumes a value obtained by subtracting the detected displacement amount Xd from 90°.

In this case, the table value of the arctangent LUT 1002 is changed by calculating a corrected input value LUTin' by:

$$LUTin'\left(=\frac{X}{Y}\right) = \tan(Xda + Xec(Xda)) \quad (8)$$

and replacing (overwriting) the conventional input value LUTin by the calculated value. The LUT output value LUTout (=Xda) is not changed.

In equation (8), Xec(Xda) is a calculation error Xec when the angle value is Xda. FIG. 24 shows the changed table value of the arctangent LUT 1002.

FIG. 26 is a graph exemplarily showing a post-area determination detection error Xea' after correction with respect to the detected tangent value X/Y. More specifically, FIG. 26 shows a post-area determination detected displacement amount Xda' and post-area determination detection error Xea' at that time when the changed table is used, that is, after correction. As can be seen from FIG. 26, the post-area determination detection error Xea' is greatly reduced.

As described above, according to the second embodiment, detection errors caused by harmonic components and nonlinear components included in encoder output signals can be suitably corrected. Also, the second embodiment is advantageous since it is configured to change the LUT itself, and does not require any additional correction value table used in the first embodiment.

Other Embodiments

Note that the aforementioned motor control apparatus is used in a camera platform of a network camera or a stage of a manufacturing apparatus, and can improve smoothness of an operation of the camera platform. The network camera includes a CPU, ROM, RAM, image capturing unit, camera platform, and network interface.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-168847, filed Jul. 30, 2012, which is hereby incorporated by reference herein in its entirety.

What is claimed is:

1. A correction value derivation apparatus for deriving a correction value used in correction of a displacement amount derived based on an encoder signal indicating a change in position of a movable portion as a target, comprising:
a displacement amount derivation unit configured to derive a detected displacement amount of the movable portion based on the encoder signal;
a displacement velocity derivation unit configured to derive a detected displacement velocity based on the detected displacement amount derived by said displacement amount derivation unit;
an average displacement velocity calculation unit configured to calculate an average displacement velocity by calculating an average of detected displacement velocities derived by said displacement velocity derivation unit over $\frac{1}{2^N}$ of one period of a change in displacement velocity indicated by the encoder signal, wherein N is a positive integer; and
a correction value derivation unit configured to derive the correction value based on the detected displacement velocity and the average displacement velocity.

2. The correction value derivation apparatus according to claim 1, wherein said displacement velocity derivation unit derives the detected displacement velocity by differentiating the detected displacement amount derived by said displacement amount derivation unit.

3. The correction value derivation apparatus according to claim 1, wherein said displacement amount derivation unit comprises:
an analog-to-digital conversion unit configured to convert two-phase analog signals input as the encoder signal into two-phase digital signals;
a determination unit configured to determine a phase range of the movable portion based on the two-phase digital signals;
a relative angle value derivation unit configured to derive a relative angle value within the determined phase range based on an arctangent value of a ratio of the two-phase digital signals; and
an angle value derivation unit configured to derive, as the displacement amount, an absolute angle value based on the phase range determined by said determination unit and the relative angle value derived by said relative angle value derivation unit.

4. The correction value derivation apparatus according to claim 1, wherein said correction value derivation unit derives the correction value by integrating fluctuation ratios of the detected displacement velocities with respect to the average displacement velocity.

5. A displacement amount derivation apparatus comprising:
the correction value derivation apparatus according to claim 1; and
a correction unit configured to correct a detected displacement amount derived by said displacement amount derivation unit by a correction value derived by said correction value derivation apparatus.

6. A control apparatus comprising:
the displacement amount derivation apparatus according to claim 5;
a driving unit configured to change a position of the movable portion; and
a control unit configured to control said driving unit based on a displacement amount derived by said displacement amount derivation apparatus.

7. A correction value derivation method for deriving a correction value used in correction of a displacement amount derived based on an encoder signal indicating a change in position of a movable portion as a target, comprising:
deriving a detected displacement amount of the movable portion based on the encoder signal;
deriving a detected displacement velocity based on the detected displacement amount derived in the deriving the detected displacement amount;
calculating an average displacement velocity by calculating an average of detected displacement velocities derived in the deriving the detected displacement velocity over $\frac{1}{2}^N$ of one period of a change in displacement velocity indicated by the encoder signal, wherein N is a positive integer; and deriving the correction value based on a difference between the detected displacement velocity and the average displacement velocity.

8. A non-transitory computer-readable storage medium storing a program for deriving a correction value used in correction of a displacement amount derived based on an encoder signal indicating a change in position of a movable portion as a target, said program controlling a computer to function as:

a displacement amount derivation unit configured to derive a detected displacement amount of the movable portion based on the encoder signal;

a displacement velocity derivation unit configured to derive a detected displacement velocity based on the detected displacement amount derived by said displacement amount derivation unit;

an average displacement velocity calculation unit configured to calculate an average displacement velocity by calculating an average of detected displacement velocities derived by said displacement velocity derivation unit over $\frac{1}{2}^N$ of one period of a change in displacement velocity indicated by the encoder signal, wherein N is a positive integer; and a correction value derivation unit configured to derive the correction value based on the detected displacement velocity and the average displacement velocity.

* * * * *